US005789908A

United States Patent [19]

LeVasseur

[11] Patent Number: 5,789,908

[45] Date of Patent: Aug. 4, 1998

[54] LIGHTING DIMMER RACK WITH REMOVABLE CONNECTOR MODULES

[75] Inventor: Craig LeVasseur, Camarillo, Calif.

[73] Assignee: NSI Corporation, Wilsonville, Oreg.

[21] Appl. No.: 611,324

[22] Filed: Mar. 8, 1996

[51] Int. Cl.[6] .......... H02B 1/01

[52] U.S. Cl. .......... 323/905; 361/730

[58] Field of Search .......... 323/905; 174/16; 361/730, 727, 826, 429, 724, 725; 315/291; 317/99; 439/34

[56] References Cited

U.S. PATENT DOCUMENTS

| | | | |
|---|---|---|---|
| 3,058,020 | 10/1962 | Balan | 323/905 |
| 3,198,991 | 8/1965 | Barnett | 361/730 |
| 3,701,928 | 10/1972 | Davis | 317/99 |
| 4,641,754 | 2/1987 | Hebel et al. | 361/826 |
| 4,972,125 | 11/1990 | Cunningham et al. | 315/291 |
| 4,977,484 | 12/1990 | Cunningham et al. | 361/429 |
| 5,352,958 | 10/1994 | Cunningham et al. | 315/291 |

*Primary Examiner*—Peter S. Wong
*Assistant Examiner*—Rajnikant B. Patel
*Attorney, Agent, or Firm*—Marger, Johnson, McCollom & Stolowitz, P.C.

[57] ABSTRACT

A dimmer rack utilizes removable connector modules for interfacing the rack to various types of standard electrical connectors in pre-existing lighting systems. The dinner rack includes a front bay for receiving dimmer modules, a rear bay for receiving the connector modules, and a patch panel for routing electrical power from the dimmer modules to the connector modules. Each connector module includes a rear panel having a connector for connecting the module to the patch panel and a front panel having a standard electrical connector for connecting the module to a lighting system. The connector modules can be fabricated with various types of standard electrical connectors.

8 Claims, 13 Drawing Sheets

LIGHTING DIMMER RACK WITH REMOVABLE CONNECTOR MODULES

BACKGROUND OF THE INVENTION

1. Field of the Invention

The present invention relates to enclosures for mounting electronic equipment and in particular to a uniquely designed symmetrically arranged housing having a plurality of insertion slots for mounting dimmer modules on the front side and a plurality of insertion slots for mounting connector modules on the rear side through which electric power is routed to lighting equipment such as incandescent lamps and control signals are routed to effects controllers such as motion control devices. The dimmer modules incorporated into the dimmer rack on the front side are connected to the electrical connector modules incorporated into the dimmer rack on the rear side through an integral patch panel within the rack.

2. Prior Art

The enclosure provided in the current invention is often referred to as a dimmer rack. Dimmer control systems utilizing dimmer racks are already in use in many lighting control applications such as in architectural, theatrical and television settings. Such racks provide the mechanical and electrical means for mounting and electrically connecting a plurality of individual dimmer modules to input power and control signals. Each dimmer module is then used to control the electric power supplied to a specific group or bank of lighting devices such as incandescent lamps. The dimmer module responds to the input and power control signals transmitted to the dimmer modules through the circuitry of the dimmer rack and delivers measured amounts of electrical power through the electrical circuitry of the dimmer rack to the lighting devices to be operated.

In various embodiments of prior art dimmer racks, structures have been provided which accept predetermined numbers of plug-in dimmer modules from 6 to in excess of 200 and one or more plug-in control modules. Typically, input and output connectors are hard mounted on the rear panel of such systems to which the input and control signals are connected and from which output power is delivered to the lighting fixtures to be operated or conduit connections must be run to and from the rack for circuit connection.

One significant drawback of the embodiments of prior art dimmer racks is that, although the dimmers are modular, the electrical power output connectors are typically hardwired and are permanent fixtures of the rack system. This design typically requires dimmer modules for each hard wired connector routing electrical power to remote lighting loads with minimal flexibility in module type and mating connectors without rewiring of the system or rack. This adds significantly to the cost of operation. Another significant drawback of hard wired connectors is the lack of uniformity of lighting systems in concert halls or arenas throughout the country. This makes the adaption of a dimmer rack to a particular lighting location cumbersome and time consuming as appropriate electrical power connectors must be hard-wired into the rack system before the dimmer rack can be utilized. Yet another drawback is that, because of their size, complexity and electrical power requirements, the racks typically are manufactured to serve as a stationary device.

These inherent problems in control applications are demonstrated in architectural, theatrical and television settings where lighting crews associated with a musical or theatrical production repeatedly are required to set up lighting grids at multiple locations, often on sequential days as the production travels from one location to another. Each location often has its own lighting system and unique electrical power connectors that can be incompatible with electrical power connectors used at other locations. Lighting crews must either depend entirely upon each location's existing lighting system or they can augment the local lighting systems with their own portable dimmer rack.

However, because the set up time allowed is often of short duration and because of the varying conditions of compatibility of existing lighting systems from location to location, each new set up presents a different and sometimes baffling set-up scenario for lighting crews. This situation is further exacerbated by the hard wired nature of the electrical power connectors inside the dimmer racks. When portable dimmer racks are being used, lighting crews are forced to hard wire electrical power connectors to the dimmer racks that are compatible with the lighting system of the current location. This task is time consuming and requires a significant dedication of resources in a situation that is often associated with short time durations in which to accomplish the electrical connector swap out. To date, there has been no economical or efficient way to minimize the problems associated with adapting the often unfamiliar lighting system of the location to the established needs of the performance to be given.

SUMMARY OF THE INVENTION

The use of a frame, stamped sheet metal side shelf supports and sliding elements (nuts, hinges and latches) are not new in themselves, however, their combination in a dimmer rack for modularity and reconfiguration (design reuse in different racks) is new and valuable in reducing development and manufacturing costs.

There exists a need for an efficient method of quickly and inexpensively adapting any concert hall's existing, and often unique, lighting system or grid venue to the needs of a musical or theatrical performance to be given.

The present invention responds to the needs of the lighting industry by providing a dimmer rack and connector module arrangement that is convenient to use, easy to set up, easy to service and which controls all of the lighting requirements. The rack is also particularly suited to adaptation for mobile use. The electrical power connectors delivering electrical power to remote lighting loads are modular and no longer hardwired. While electrical connectors typically vary from one concert hall or arena to another, there is a finite number of electrical power connectors. The invention disclosed anticipates all the various types of electrical connectors being used in the industry and prepares for any electrical power connector contingency. With a modular plurality of every different type of electrical power connector in use, the new dimmer rack invention can interface with any pre-existing lighting system or grid in any type of concert hall or arena anywhere in the country. By selecting from the inventory store containing every variation of modular electrical power connectors the appropriate plurality of modular electrical power connectors, that are compatible with the given concert hall or arena, are inserted into the portion of the dimmer rack designed to accept the modular electrical power connectors. This allows a lighting crew, once the lighting system and electrical connectors of the existing concert hall or arena have been ascertained, to quickly and efficiently connect into the house system and control all lighting needs through the portable dimmer rack.

The rack design according to the present invention provides a plurality of dimmer modules arranged in one single vertical row on a front bay. A second plurality of electrical power connector modules are arranged in a single vertical row in a rear bay of the rack. In addition, the present invention provides a modular slot mounting system, formed by horizontal tabs, which are adapted to receive each module. The punched tabs extending from the side walls of the front and rear bays create slots which receive the chassis of the dimmer and electrical power connector modules to precisely position each module in its slot and guide it into and out of electrical connections with the power input, load and control signal distribution buses.

In the presently preferred embodiment, first electrical termination means are incorporated into a first side of the dimmer bay for receiving and distributing input power to be controlled by the dimmer modules. On the side opposite said first side, second electrical termination means are incorporated for receiving and distributing control signals, and adjacent to the second termination means third electrical termination means are incorporated into the bay for receiving output power from a dimmer module and transmitting said power to a patch bay.

Through the patch bay, electrical power fed from the dimmer modules is routed to connector modules mounted in the connector bay. The connector module is designed to interface with the electrical connectors in existence at the particular location the dimmer rack is to be employed in. Typically, sets of connector modules with various common types of electrical power connectors for the stage and theatrical lighting industry are kept in storage. This enables technicians to quickly swap out the incompatible electrical power connectors installed in the dimmer rack with electrical power connectors that are compatible with the electrical power connectors at the particular location.

The connector modules are mounted in the connector bay. Fourth electrical termination means are incorporated into a first side of the connector bay for interconnection to neutral circuit returns. On the side opposite said first side, fifth electrical termination means are incorporated into said connector bay for receiving and distributing load signals received from the patch bay system.

A connector module reduces the manufacturer wiring in the rack, enables the user to configure the output connections easily for different venues, reduces cost to manufacture and allows the output connectors to be returned for service while the rack continues in use. The connector module is also a "mirror image" of the dimmer module with a commonality of parts which reduces manufacturing costs.

DETAILED DESCRIPTION

Figure 1:
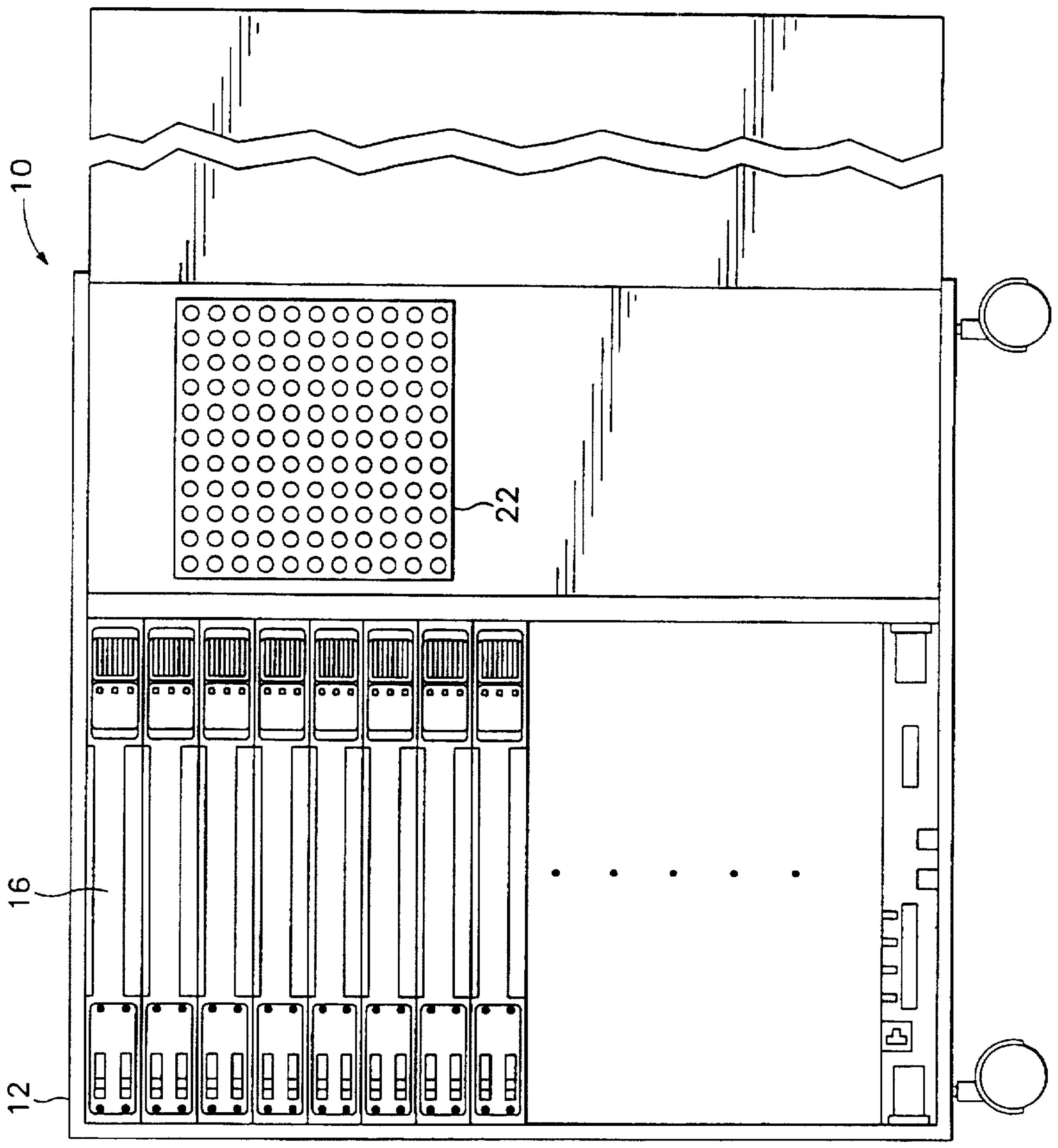
FIG. 1 is a front elevation view of a dimmer rack according to the present invention.
Figure 2:
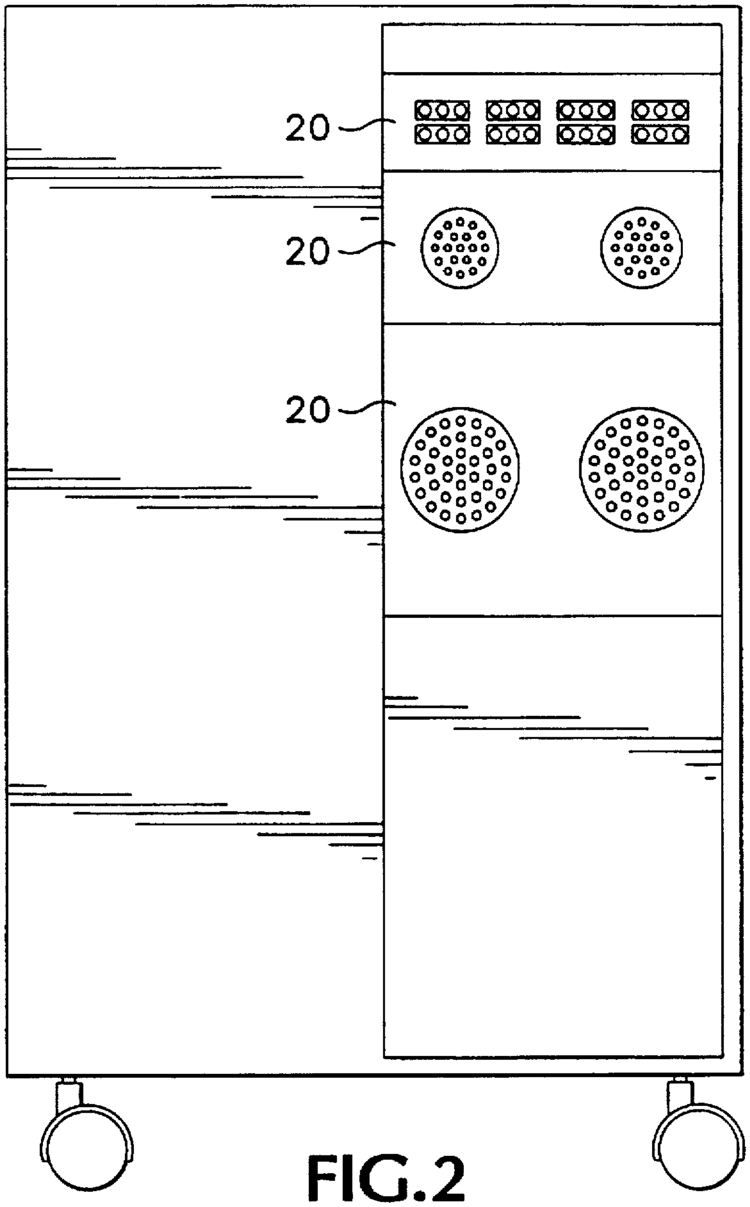
FIG. 2 is a rear elevation view of a dimmer rack according to the present invention.
Figure 3A:
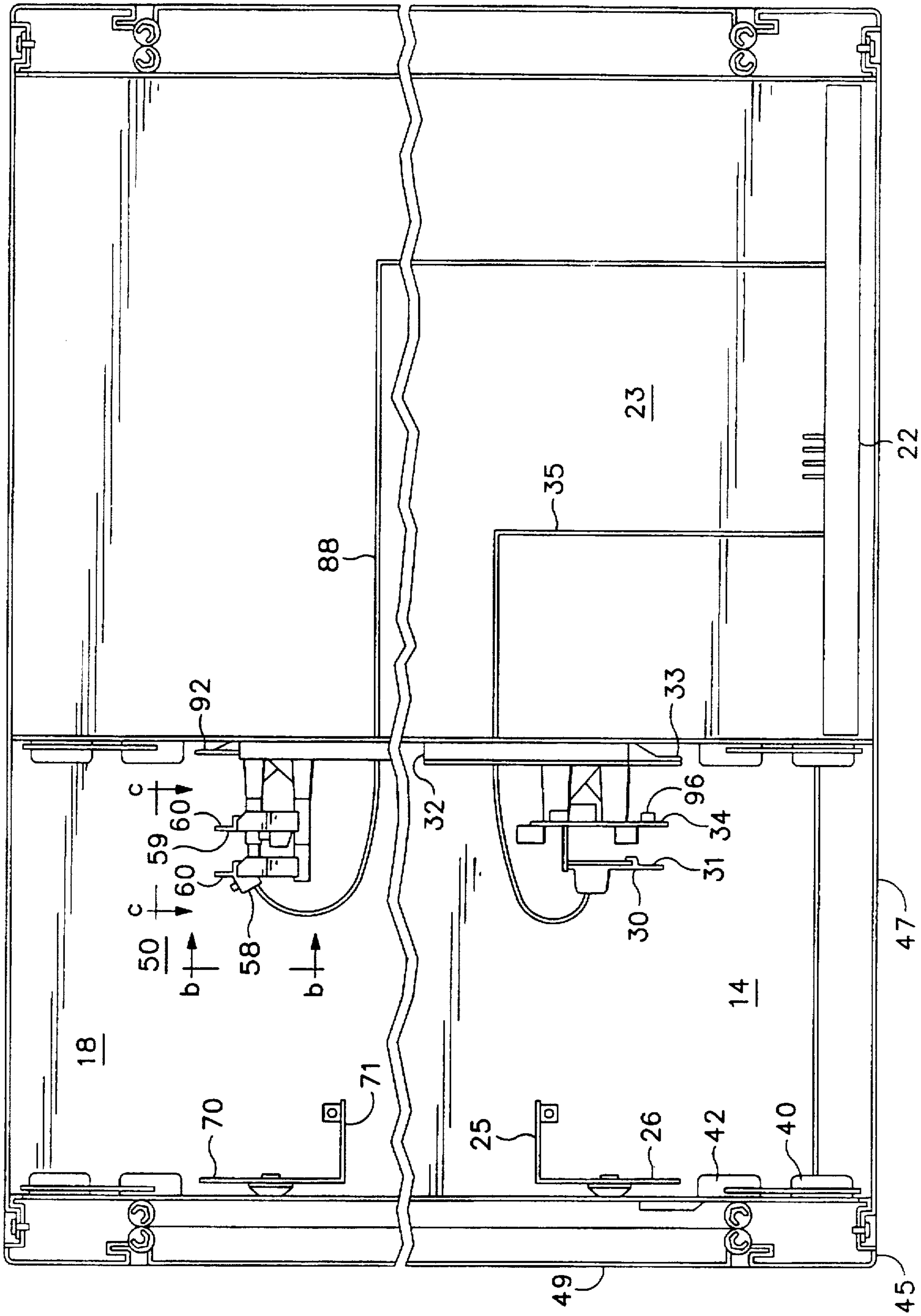
FIG. 3*a* is a top sectional view of a dimmer rack according to the present invention.

A dimmer rack according to the present invention is illustrated in FIGS. 1 through 3. As shown therein, a rack 10 comprises a housing 12 with a front bay 14 including a plurality of dimmer modules 16 stacked vertically one on top of the other received within slots formed in the side panels of the front bay of the housing. The dimmer rack's housing also comprises a rear bay 18 including a plurality of connector modules 20 stacked vertically one on top of the other received within slots formed in the side panels of the rear bay of the housing. The front bay 14 and rear bay 18 of the housing are "mirror images" of each other. The dimmer modules and connector modules are interconnected through a patch panel 22 mounted adjacent the dimmer module stack and accessed through the front door of the rack. In the embodiment shown in the drawings, the patch panel is mounted on the front panel of a side bay 23, adjacent the dimmer and connector bays.

Dimmer racks according to the present invention can be provided in various configurations and are characterized in the drawings by a rack having a single vertical stack containing all the dimmer modules. Likewise, dimmer racks incorporating the present invention are characterized in the drawings by a rack having a single vertical stack containing all the connector modules. Configuration of the dimmer rack incorporating the present invention for mobile use is accomplished by wheel mounting the frame of the rack as shown in FIG. 1 or mounting the rack on a fork lift skid for easy transportation.

Figure 3B:
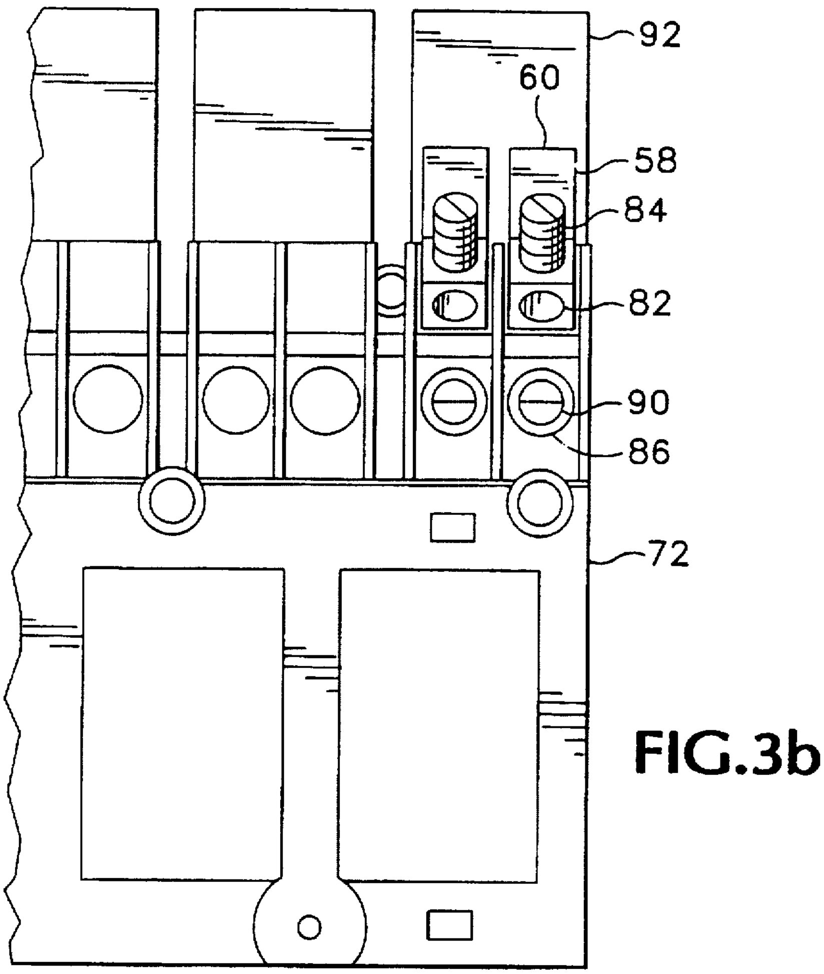
FIGS. 3*b* and 3*c* are detailed views b—b and c—c of FIG. 3*a*.
Figure 3C:
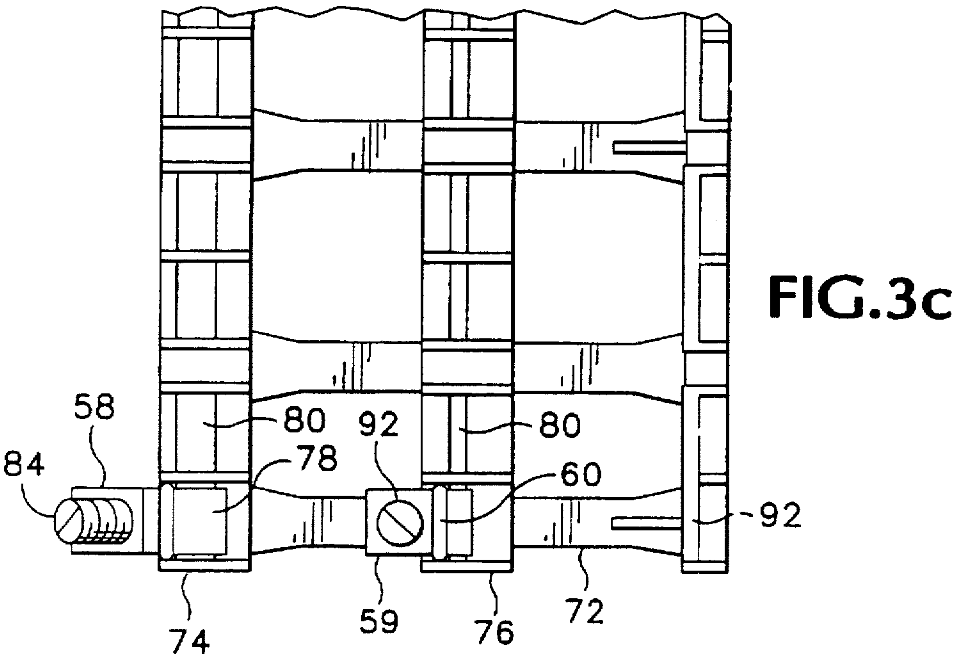
Figure 4:
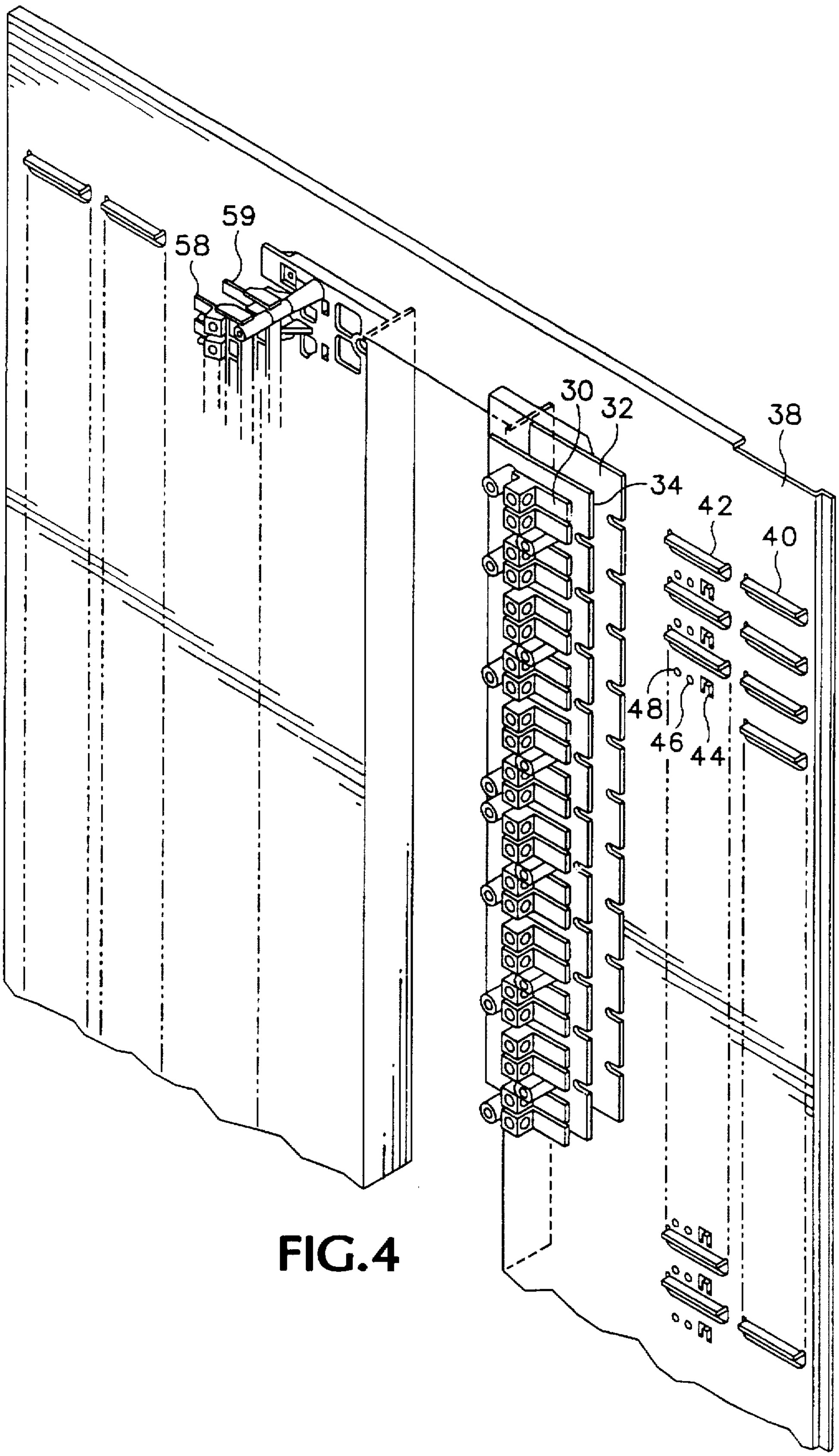
FIG. 4 is a detailed view of the right internal side panel showing slot support tab arrangement and connectors for the dimmer module bay and connector module bay.
Figure 5:
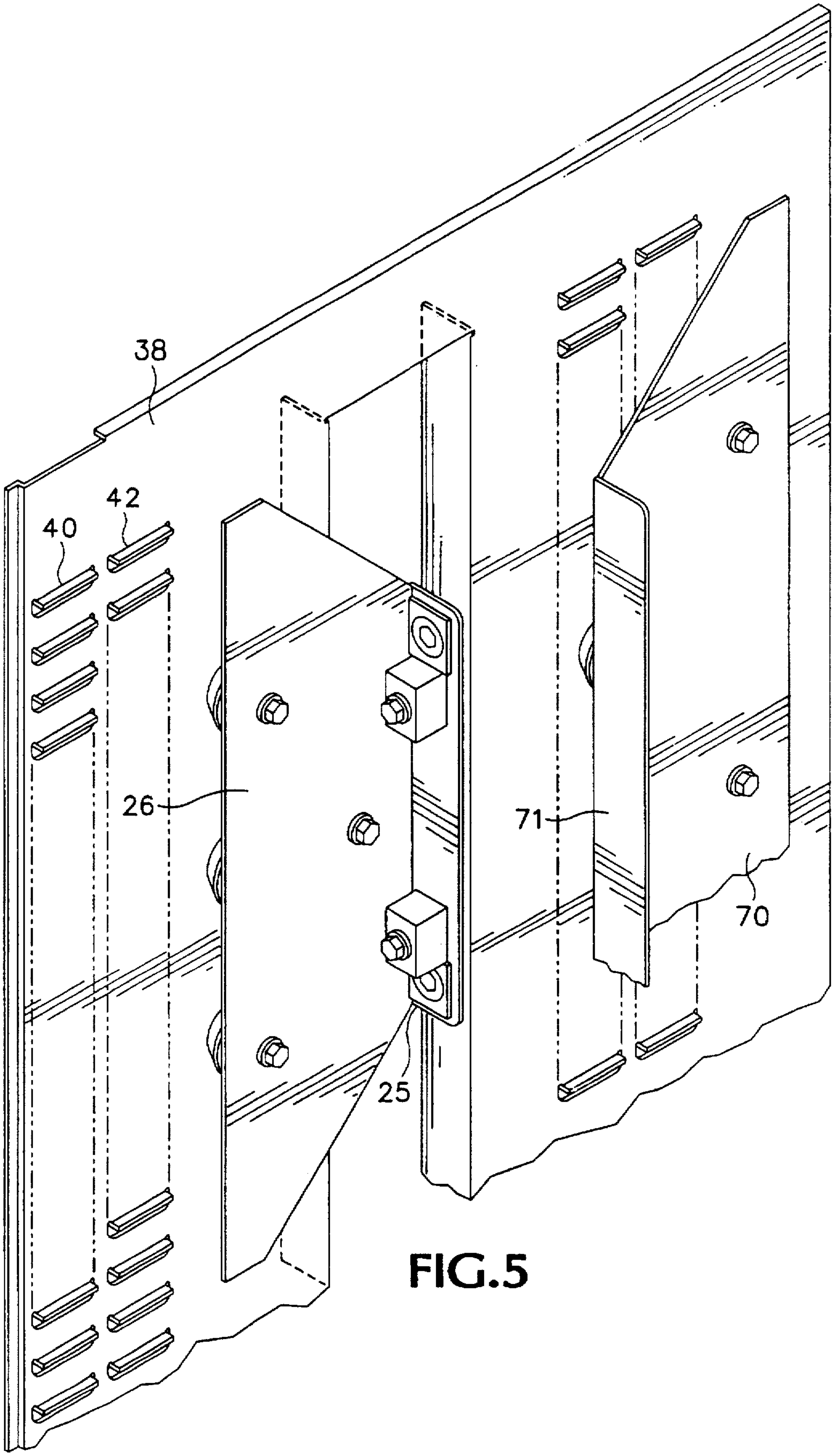
FIG. 5 is a detailed view of the left internal side panel of the rack.

Details of the structural arrangement of the rack are best seen in FIGS. 3, 4 and 5 shown with the dimmer modules and connector modules removed from the rack. In the dimmer module bay, power feed buses 26 each receiving power from one phase of a three phase supply are provided at three locations on the left side of the rack vertically spaced such that each blade of the power bus feed supplies one-third of the slots for dimmer modules. In alternative embodiments for single phase power applications, two power bus blades each feeding half the slots may be employed. An extension 25 is integrally formed with power distribution bus 26 and extends at right angles from bus 26. One or more connector lugs are mounted on extension 25. An input power cable is connected directly or through a removable connector (not shown) to the lug for delivering input power to the rack.

Neutral connections are routed to a neutral bus bar 70 as described in greater detail subsequently. A pair of load output terminals 30 corresponding to each slot in the dimmer bay of the rack are mounted on a main insulator 32 adjacent the right hand wall of the bay and control signal cards 34 terminating in edge connectors are mounted intermediate the load terminals and right wall of the bay. Load terminals 30 include integrally formed blade-shaped contacts 31. The load terminals are mounted on and snap fitted into stand off insulators. The contacts 31 are spaced from the side wall of the dimmer module bay so that the contacts can engage mating receptacles at the rear of the dimmer modules, as will be described in greater detail subsequently. The load terminals also incorporate receptacles and clamping screws. Individual load wires from the dimmer bay to the patch panel are inserted into receptacles and secured by the clamping screws. Each wire extends to the patch panel 22.

Supporting slots for the dimmer modules are formed in interior sheet metal panels 38 on the left and right walls of the dimmer bay by a precision punch and brake operation forming a forward support guide 40 and a rearward support guide 42 for each slot on each side of the bay. Keying to avoid placement of an improperly rated dimmer module in a pre-wired slot in the rack is accomplished using a punched metal tab 44 and two retaining screw holes 46 and 48 in each slot. The punch tab is located forward of the retaining screw holes for initial engagement of a mating protrusion, which on present embodiments comprises a counter sink screw head having an angle complimentary to the angle of the tab, mounted on higher amperage dimmer modules as will be described in greater detail subsequently. Keying for higher power modules is accomplished by physically removing the punch tab by bending into the punch aperture flush with the wall to allow engagement of a retaining screw mounted in hole 48 depending on the type of module for which the slot has been wired. A screw present in hole 48 will prevent installation of the highest amperage rated dimmer module while no tab or screw allows any amperage dimmer into a slot wired for the highest amperage rating. Hole 46 is provided for insertion of a screw to act as a replacement for the keying tab if the tab is removed and subsequent use of that slot for a lower power module is required. The triple keying approach provides great flexibility in pre-wiring slots for various dimmer module configurations.

The rear connector module bay of the rack is similarly configured to receive connector modules in slots formed by punched tabs extending from the walls of the bay. Mating load input terminals 58 and 59 which include integrally formed blade-shaped contacts 60 are mounted on and snap fitted into standoff insulators. The contacts 60 are spaced from the side wall of the connector module bay, two vertical pairs adjacently mounted in each slot, so that the contacts can engage the slot-shaped receptacles in the load input connectors in the rear of the connector modules, as will be described in greater detail subsequently.

For the embodiment shown in the drawings, the load output terminals are mounted in pairs in two vertical rows. Additional density for rack connection circuitry may be obtained by mounting a third vertical row of load output terminal pairs. For connection to the patch panel, terminals 58 and 59 also incorporate receptacles and clamping screws. Individual wires 88 leading from the patch panel 22 to the load input terminals are inserted into receptacles and secured by the clamping screws. Details of the support structure for load input terminals 58 and 59 is shown in detail in FIGS. 3*b* and 3*c*. A molded insulator 72 provides a plurality of receptacles 74 and 76 which receive load input connectors 58 and 59 respectively. Each of the load input connectors incorporates a tang 78 received over a web 80 in the receptacle with a snap retainer to secure the load input connector to the receptacle. In FIG. 3*b* only the top two input load connectors are shown while in FIG. 3*c* only the top outer load connector 58 and inner load input connector 59 are shown to allow demonstration of the features of the insulator. The connection lug of outer load input connector 58 is angled as shown in the drawings to allow easy routing and insertion of connection cables 88 from the patch panel to receiving holes 82 in the lug. A clamping screw 84 retains the interconnection cables in the lug.

Inner load input connector 59 employs a lug arrangement perpendicular to the blade of the connector and apertures 86 in the material of the insulator allow insertion of cables through the insulator into the receiving hole 90 of the inner lug. A retaining screw 92 is employed to secure inserted cable in the inner lug. The web of the receptacle for the outer load input connector is molded to be wider than the web on the receptacles for the inner load input connector to provide greater stability for the outer load input connector in view of its shorter length. The shorter length of the outer load input connector accommodates clearance for the apertures 86 for wire pass through to the inner load input connector.

The combined arrangement of the pass through aperture for cabling insertion into the inner load input connector and the angled lug on the outer load input connector provides excellent cable direction management for ease of wiring in the connector bay.

Figure 7:
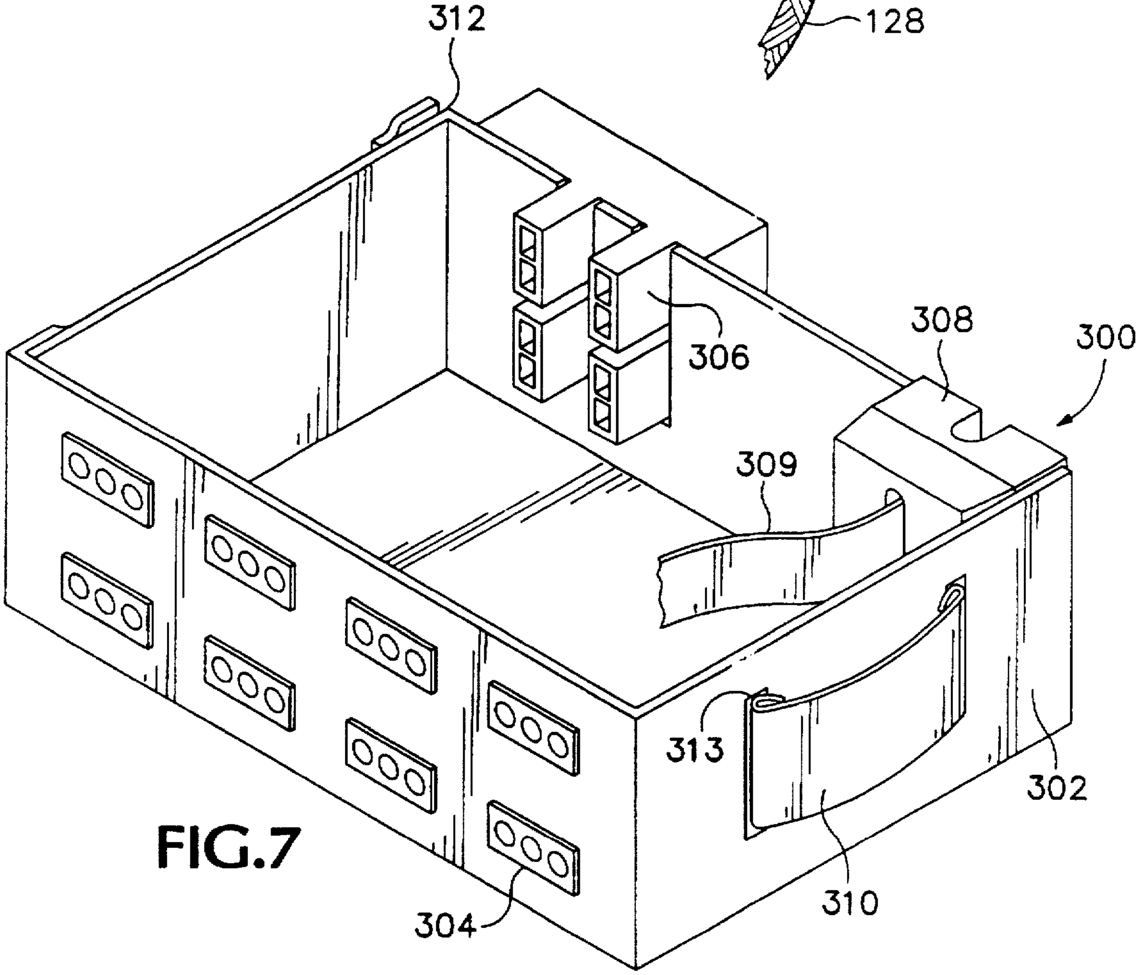
FIG. 7 is a detailed perspective view of a representative connector module employed in the rack of the present invention.

Probes 92 on the insulator standoff are received in slots 312 on the connector modules as shown in FIG. 7 to retain the datum wall of the connector module adjacent the interior wall of the connector bay for tolerance control.

Neutral bussing is provided for the connector modules through neutral bus blade 70 similar in configuration to the power bus blades contained in the dimmer module bay. The neutral bus blade, in the embodiment shown in the drawings, extends the entire vertical extent of the connector module bay. An extension 71 is integrally formed with the neutral bus blade and extends at right angles from the bus. One or more connector lugs are mounted on extension 71. A neutral conductor cable is connected from the lug directly or through a removable connector (not shown) for input power return from the rack.

The dimmer rack is of modular configuration employing extruded corner posts 45 mounted between base and top frame members 47. The interior sidewall panels 38 previously discussed are attached to the corner posts and exterior panels 49 provide a finished appearance for the rack attaching to the corner posts through blind fastening arrangements.

Dimmer modules designed for use in accordance with the present invention employ single, dual or quad dimmer configurations. The embodiments shown in the drawings demonstrate a dual dimmer configuration while a quad dimmer configuration is disclosed in co-pending patent application Ser. No. 08/588,393, filed on Jan. 1, 1996, having a common assignee with the present application. A quad dimmer capable system would require the addition of a second vertical row of load connectors 30 mounted on insulator standoffs inboard from the load connectors shown in FIGS. 3 and 4.

The physical design of a dual dimmer module employed in the present invention is illustrated in FIG. 6. The dimmer module 110 comprises a chassis 112 formed, in the embodiment shown, from die-cast aluminum. The chassis incorporates a left side wall 114, a right side wall 116 and a face plate 118.

As depicted in FIG. 6 the dimmer module is capable of controlling two separate lighting fixtures or two groups of interconnected fixtures. Input power is received by the module through connector 124 located adjacent the left wall of the chassis. A floating contact 126 is incorporated in the power connector to accommodate tolerance buildup in mating the connector module to dimmer racks. The floating contact includes an extended conductor 128. Two circuit breakers 132*a* and 132*b* control the input power for the two loads of the dimmer module. Breakers 132*a* and 132*b* are mounted in a stack 134 attached to the face plate of the chassis.

Two inductors 136*a* and 136*b* comprising toroidal chokes for current supply in the dimming control circuits are mounted in the chassis. Input power is provided from the conductor extension to the line contacts of the circuit breakers. Vertical interconnection of the breakers in the stack is accomplished, in the embodiment shown in the drawings, through a standard bus bar arrangement. Power is routed from the load contacts 140 of the circuit breaker stack to the inputs of inductors 136*a* and 136*b*.

A power device generally designated 142 is mounted in the chassis adjacent the right wall. The power device comprises a top board 144 which incorporates control circuitry for the dimmer module, and printed circuit substrate 146 which is mounted to a finned heat sink 150.

The arrangement of the dimmer module compensates for tolerance accumulation in fabrication of the device and the dimmer rack. The right hand wall of the dimmer module and the interior panel for the right hand wall of the rack constitute the datum for dimensioning. The left hand wall of the dimmer module incorporates a slot arrangement 226 which receives a side load spring 228. In the embodiment shown in the drawings the side load spring comprises two lobes 230 and 232 connected by a web 234 which incorporates a formed clip 236 received over the top edge of the left wall of the dimmer module chassis substantially centered in the slot arrangement to secure the spring to the chassis. The lobes of the side load spring flex to engage the left hand interior panel in the dimmer bay intermediate the guides for each slot urging the entire chassis to the right thereby firmly engaging the right chassis wall with the right interior panel of the dimmer bay. This allows high accuracy in placement and dimensioning of the control signal connector 34 and the mating connector 224 on the dimmer module due to their close proximity to the datum. Performance of the invention is thereby enhanced since the control signal connector 34 may employ standard printed circuit board edge connector technology without concern over highly accurate dimensional control of the dimmer module engagement in the dimmer rack slot.

Similarly, the load connectors may employ substantially lower tolerance contacts based on placement proximate the datum.

A probe 33 extending from the main insulator as best seen in FIGS. 3 and 4 is received in slot 238 in the chassis to prevent displacement of the chassis to "jump" the configuration tabs.

Figure 6A:
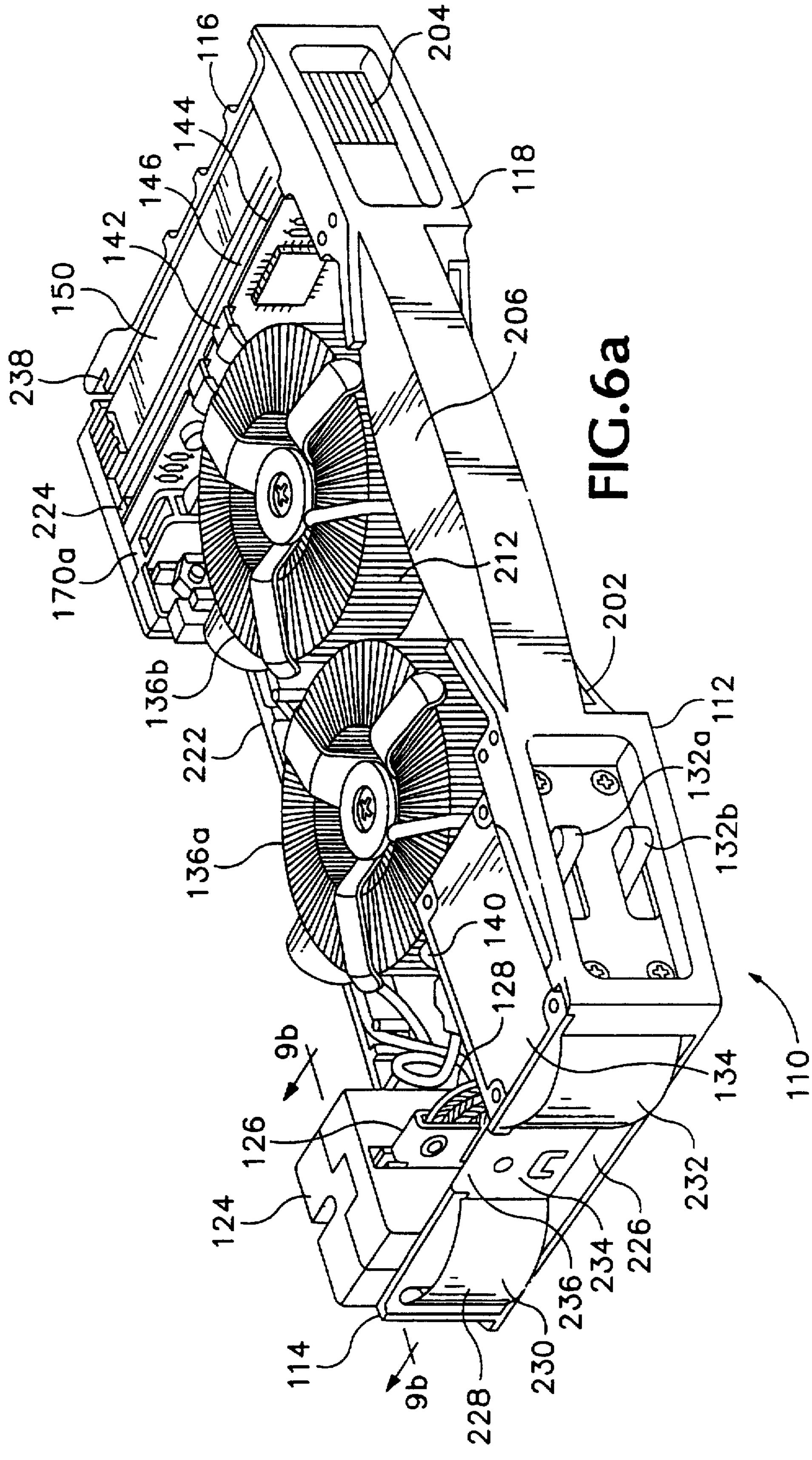
FIG. 6*a* is a detailed perspective view of a representative dimmer module employed in the rack of the present invention.
Figure 6B:
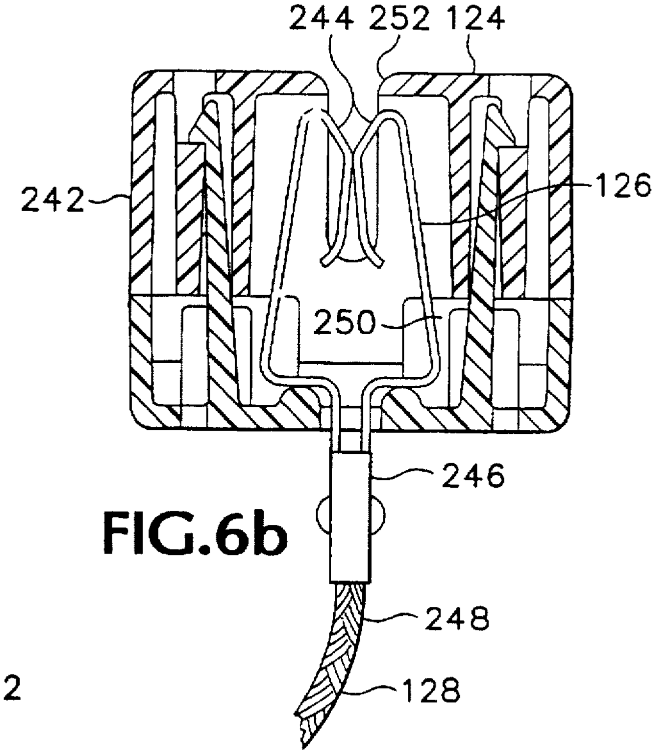
FIG. 6*b* is a detailed top sectional view of the power connector employed in the dimmer module and the neutral connector employed in the connector module.

The power connector for the dimmer module is specially designed, as shown in the embodiment presented in FIG. 6*b*, to provide a floating contact 126 received in the housing 242 of the power connector. The floating contact comprises two spring contacts 244 engaging one another in connection tangs 246 which are mated employing a standard rivet or other compressive mounting technology or welding the contacts and braid. The conductor braid 128 is engaged between the connection tangs and similarly secured by the rivet. The floating contacts are constrained within the connector case by engagement slots 250. Lateral motion is therefore possible by the floating contact to engage the blade of the power bus 26 which is received in slot 252 in the connector. Slot 252 is oversized in lateral dimension sufficient to accommodate any tolerance buildup in the dimmer module construction. The flexible braid allows lateral motion of the floating connector and is connected opposite the floating contacts for electrical attachment to the circuit breakers in the dimmer module.

In addition to providing lateral positioning of the dimmer module, the side load spring masks the left hand interface of the dimmer module with the dimmer rack to preclude airflow through the slot exterior to the dimmer module. Additionally, the side load spring provides the ground contact with the dimmer rack for the dimmer module providing a common chassis ground.

The physical design and arrangement of the connector module components are shown in FIG. 7. As shown therein, the connector module 300 comprises an assembly which is mounted in a chassis 302. The chassis is two slots in height in the embodiment shown in FIG. 7, and eight three pin connectors 304 are mounted in the front face of the chassis. On the rear face of the chassis, eight load input connectors 306 are mounted in pairs adjacent the left wall to receive the blades of the load terminals 58. These input connectors provide the load inputs to the connector module which are distributed to the connectors on the front face of the module as described with respect to FIGS. 8*a* and 11*a*. Also mounted on the rear face of the chassis adjacent the right wall is a floating connector 308 substantially identical to the power connector 124 in the dimmer modules described above. This floating connector receives the neutral bus blade 70, providing neutral return for the circuits carried by the connector module. Flexible conductor braid 309 is employed for connection to neutral return of the individual pin connectors through a bus block or other conventional means.

Figure 8A:
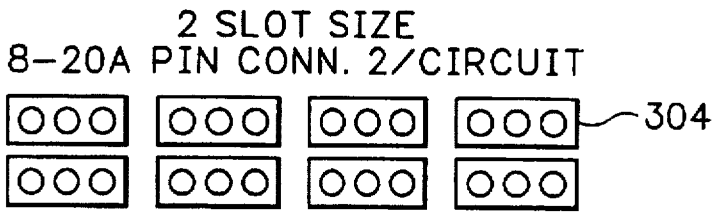
FIG. 8*a* is a front view of the connectors employed in a 2 slot connector module.
Figure 9A:
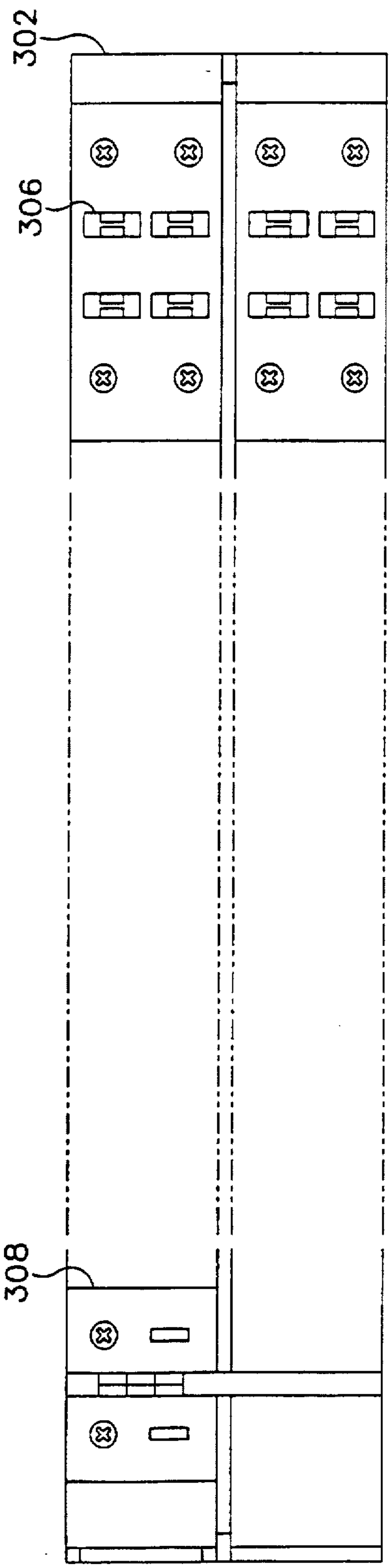
FIG. 9*a* is a rear view of a 2 slot connector module.

As with the dimmer module, the connector module employs a side load spring 310 mounted to the side wall of the chassis to urge the connector module chassis toward the interior bay wall which comprises the dimensioning datum. The right hand wall of the connector module (looking from the front of the connector module) incorporates a slot arrangement 313 which receives the side load spring. The spring also provides ground contact for the chassis to the structure of the rack. The electrical connectors 304 provide the interface for connection to an external lighting load (not shown). A front view of the 2 slot height connector module of the embodiment described is shown in FIG. 8*a* with a rear view shown in FIG. 9*a*.

Figure 8B:
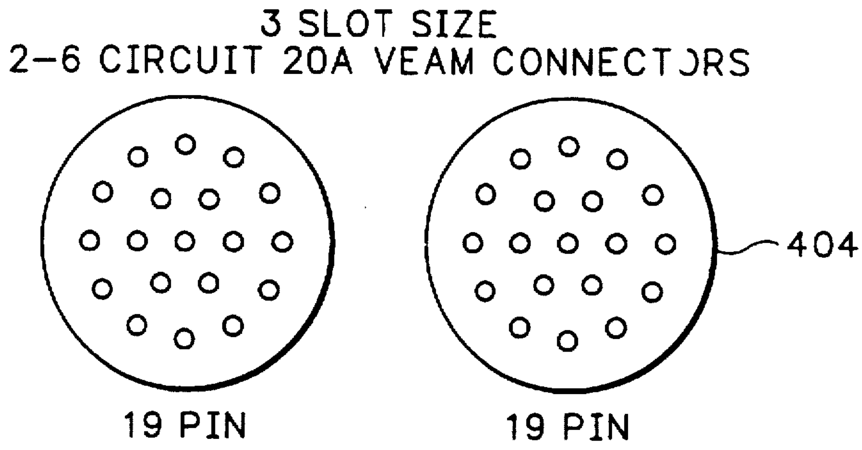
FIG. 8*b* is a front view of the connectors employed in a 3 slot connector module.
Figure 9B:
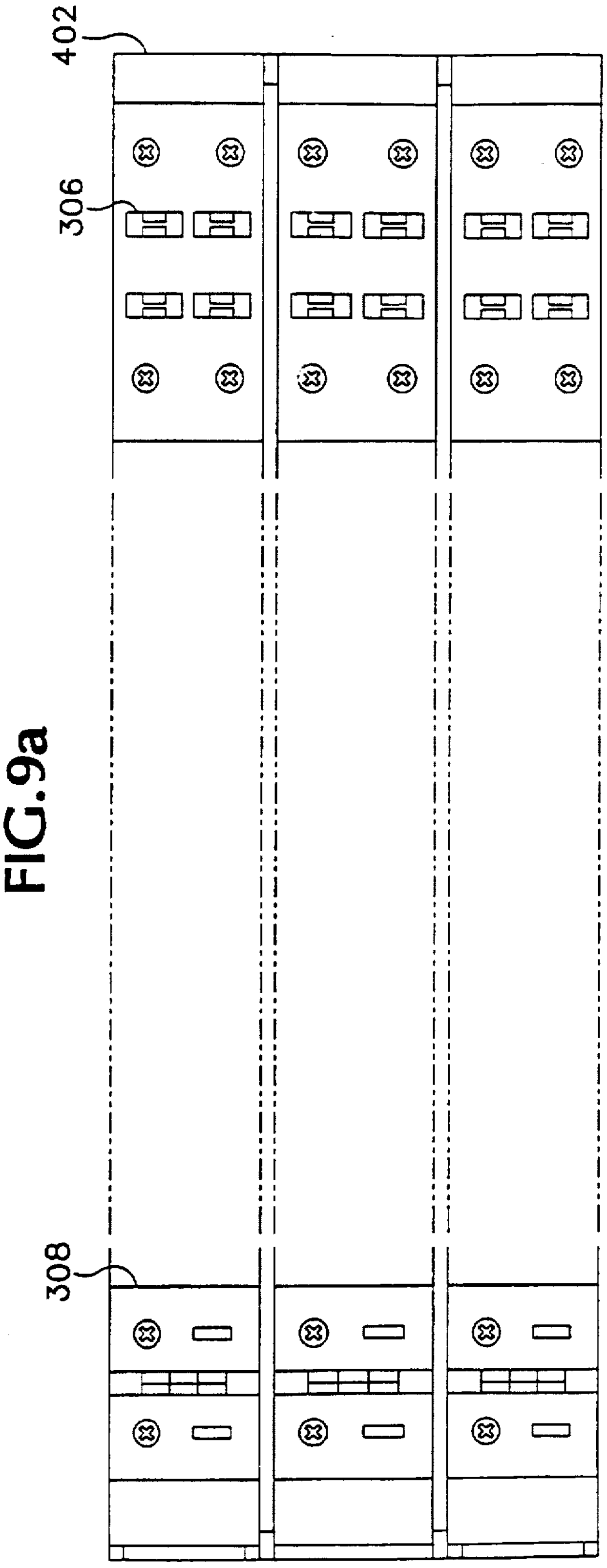
FIG. 9*b* is a rear view of a 3 slot connector module.
Figure 9C:
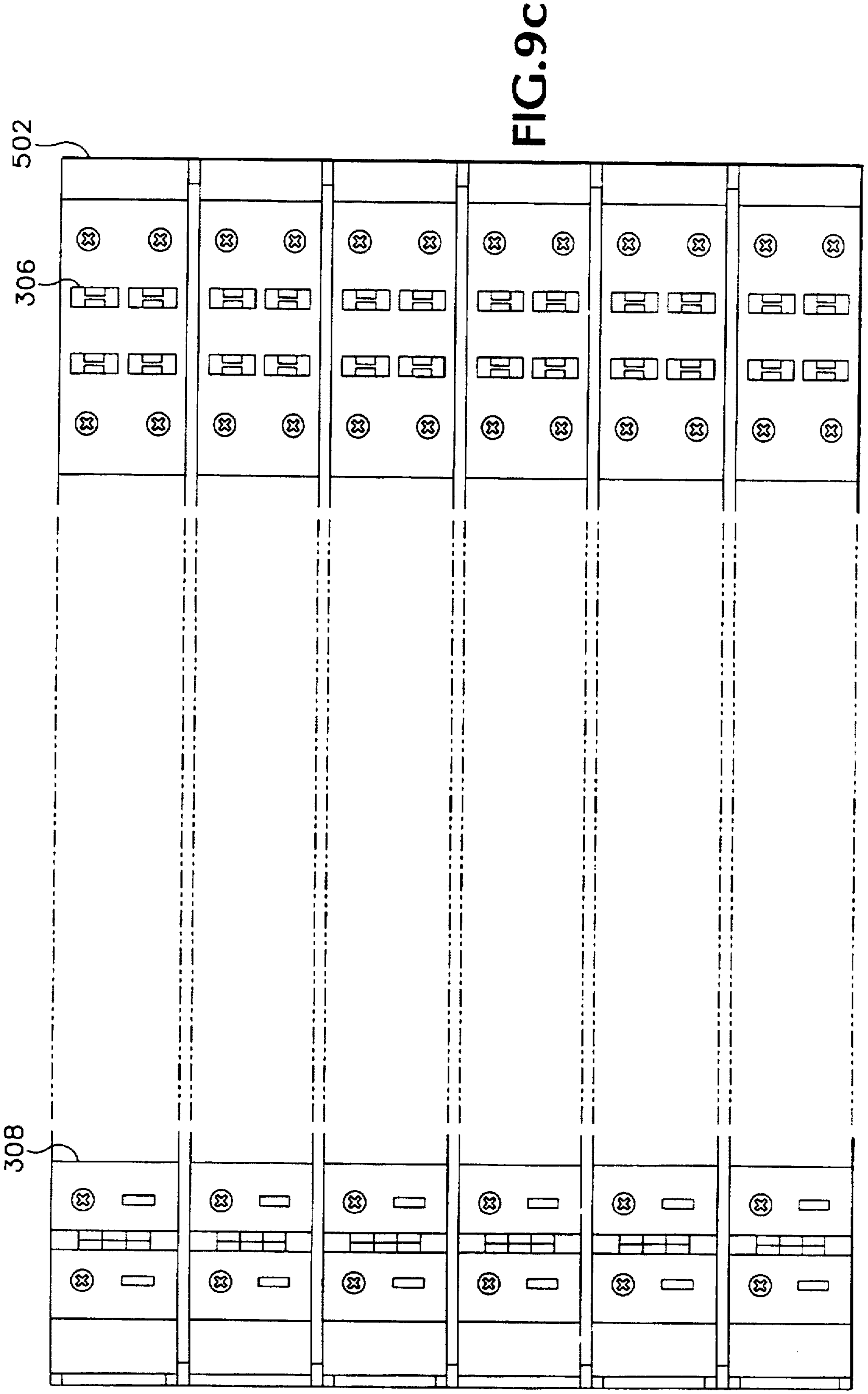
FIG. 9*c* is a rear view of a 6 slot connector module.

In multiple alternative embodiments of the connector module, the electrical connectors 304 are replaced by any of the finite number of electrical connectors used to complete a connection to an external light load or effects controller. FIGS. 8*b* and 9*b* show an additional preferred embodiment for the connector module employing a 3 slot height chassis 402. Two 19 pin (6 circuit) Veam/Socapex connectors 404 are provided in the front panel of the module. On the rear face of the chassis, 12 load input connectors 306, four in each slot height, are mounted to engage the blades of load terminals 58. Three floating connectors 308 are mounted vertically adjacent the right wall of the chassis, one in each slot height, to receive the neutral bus blade.

Figure 8C:
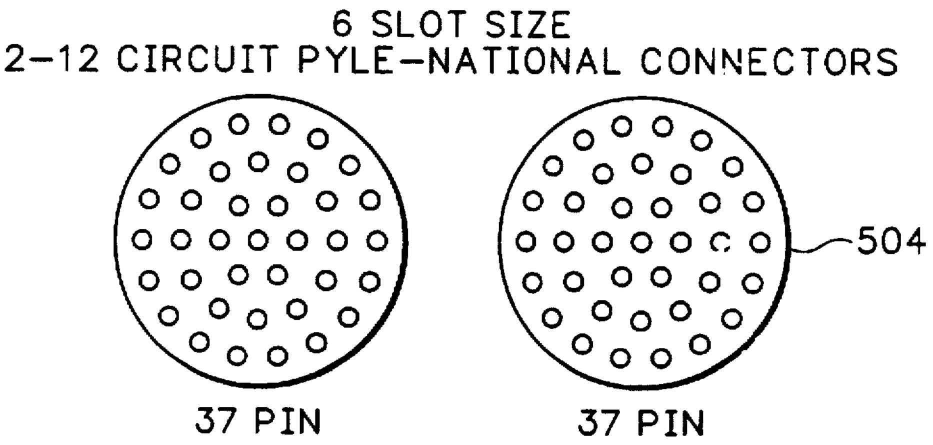
FIG. 8*c* is a front view of the connectors employed in a 6 slot connector module.

A third preferred embodiment for the connector module employing a 6 slot height chassis 502 is shown in FIGS. 8*c* and 9*c*. Two 12 circuit Pyle National connectors 504 are mounted in the front panel for connection to the lighting or effects controller loads. 24 load input connectors 306 are mounted in the rear face of the chassis, four in each slot height. Six floating connectors 308 are mounted vertically adjacent the right wall of the chassis, one in each slot height, to receive the neutral bus blade.

Figure 10A:
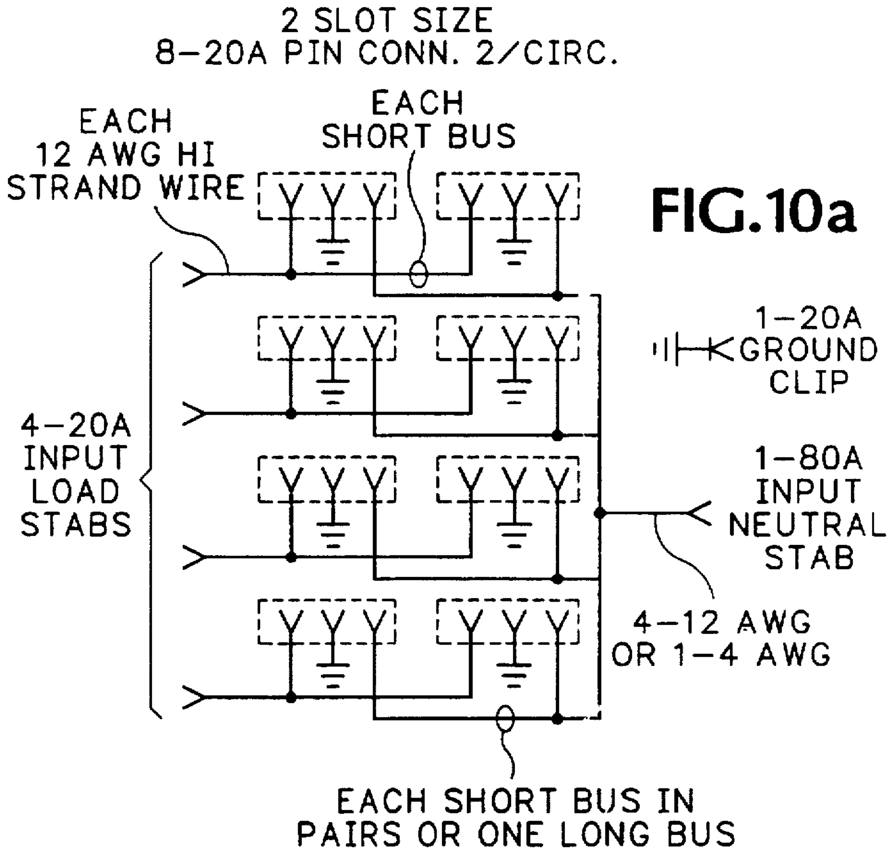
FIG. 10*a* is a wiring schematic for a 2 slot connector module.
Figure 10B:
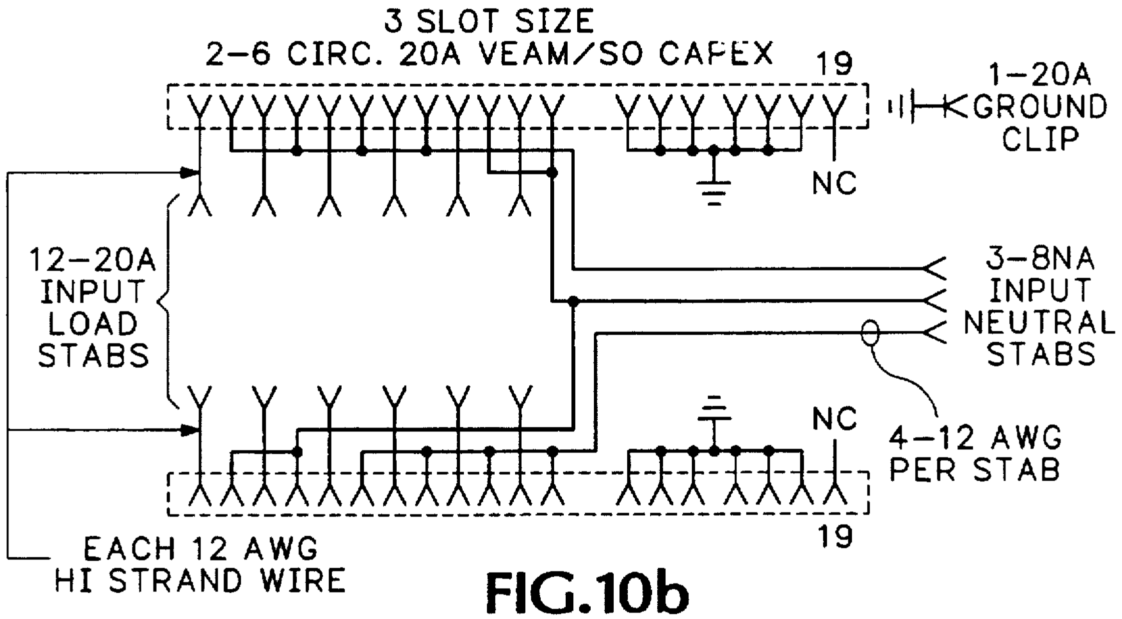
FIG. 10*b* is a wiring schematic for a 3 slot connector module.
Figure 10C:
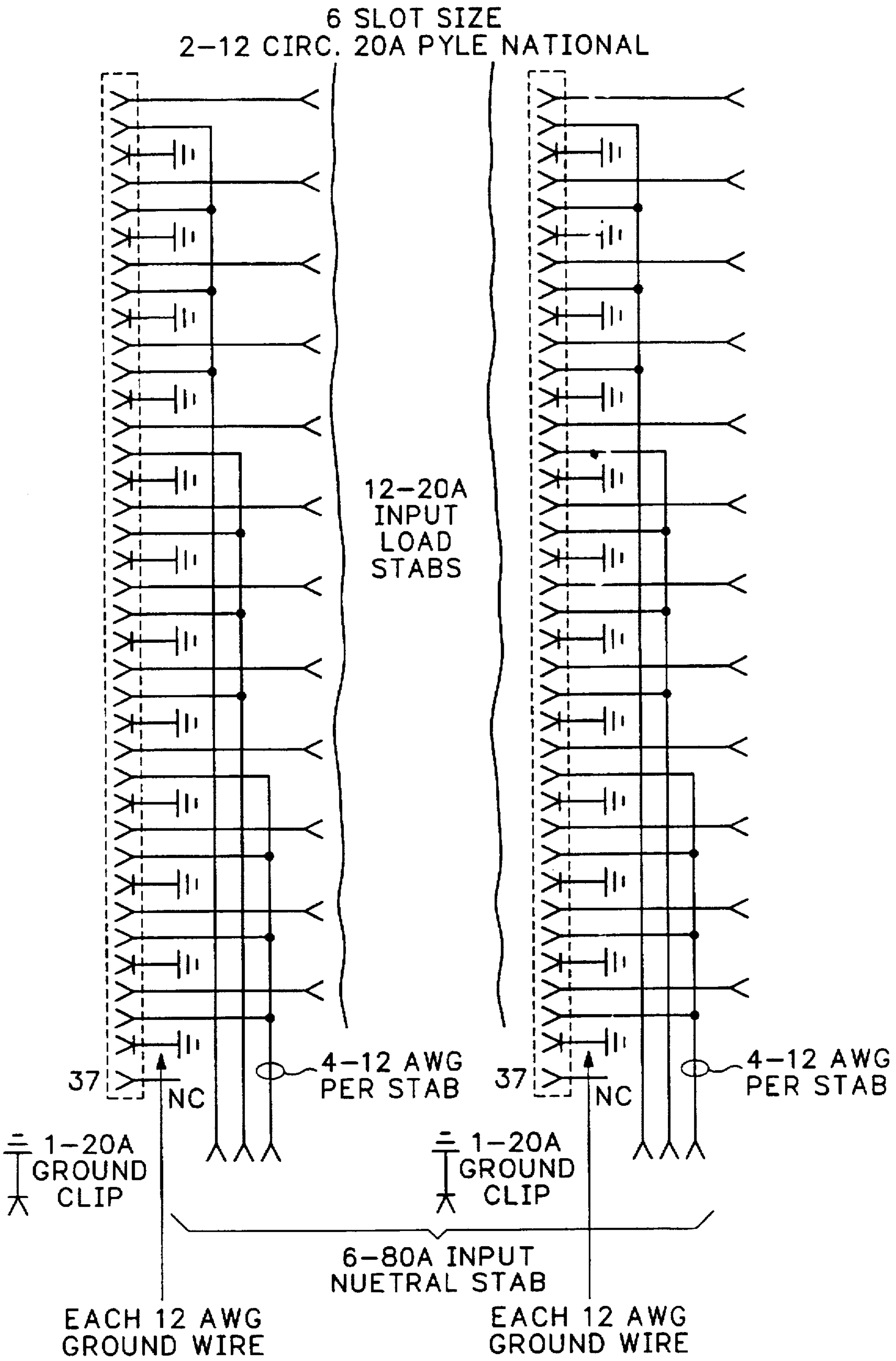
FIG. 10*c* is a wiring schematic for a 6 slot connector module.

Electrical schematics showing the wiring scheme for the 2, 3 and 6 slot height connector modules are shown in FIGS. 10 *a,b* and *c* respectively.

Active autonomous control for various effects controllers to be attached to the connector modules is accomplished with the present invention through incorporation of a microprocessor controller in the connector module. Communication between the microprocessor in each dimmer module and the associated connector module, as determined by appropriate patching, is accomplished by insertion of board connectors intermediate the connector bay interior wall and the load input connectors 58 in complimentary fashion to that disclosed for the dimmer module; e.g. board connector 34 and mating connector 224 as shown in FIGS. 3*a* and 6*a* respectively. Addition of connection lugs to the board connectors in the dimmer module bay and connector bay with routing of cabling from those lugs to the patch panel as described previously for load output and input connections, provides patching capability for desired control signals.

Having now described the invention in detail as required by the patents statutes, those skilled in the art will recognize modifications and substitutions to the embodiments disclosed for use in particular applications. Such modifications and substitutions are within the scope and intent of the present invention as defined in the following claims.

What is claimed is:

1. A lighting dimmer rack adapted for supporting a plurality of dimmer modules and for supporting a plurality of connector modules, the rack comprising:

a housing having first and second walls and including:

a front bay having:

a vertically stacked plurality of module holders formed in said first and second walls and adapted for receiving a plurality of dimmer modules;

multiple sets of vertically stacked electrical terminals for connecting each stacked dimmer module to the rack, each set of electrical terminals having at least:

a power terminal mounted in spaced relation from said first wall for receiving and distributing input power to be controlled by the dimmer modules;

a control terminal mounted in spaced relation from said second wall for receiving and distributing control signals;

a load output terminal mounted in spaced relation from said second wall inboard from said second electrical terminal, for receiving output power from the dimmer modules;

a rear bay including:

a vertically stacked plurality of module holders formed in the first and second walls and adapted for receiving a plurality of connector modules;

multiple sets of vertically stacked electrical terminals for connecting each stacked connector module to the rack, each set of electrical terminals having at least one neutral bus connector mounted in spaced relation from said first wall;

a load input terminal mounted in spaced relation from said second wall; and means for connecting any load output terminal in the front bay to any load input electrical terminal of the rear bay and neutral returns from said dimmer modules to said at least one neutral bus connector.

2. A lighting dimmer rack as defined in claim 1 wherein the connecting means comprises a patch panel.

3. A lighting dimmer rack as defined in claim 2 wherein the housing further comprises a third wall and said second wall is an interior wall intermediate said first and third wall, said second and third wall forming a side bay wherein the patch panel is mounted.

4. A lighting dimmer rack as defined in claim 3 further comprising a front door closure extending over said front and side bays.

5. A lighting dimmer rack as defined in claim 1 further comprising at least one connector module adapted for mounting in said rear bay, said connector module having:

a chassis having a front panel, a rear panel and first and second opposing side panels;

at least one load input connector mounted in said rear panel adjacent said first side panel, said load input connector adapted for connection to said load input terminal;

at least one floating terminal connector mounted in said rear panel proximate said second side panel, said floating terminal connector adapted for connection to said neutral bus connector; and at least one standard lighting connector mounted in said front panel and electrically connected to said load input connector and to said floating terminal connector for neutral return.

6. A mobile lighting dimmer rack as defined in claim 5 further comprising a side load spring mounted to said first side and urging said second side of the chassis against the second wall in the dimmer rack, said second wall constituting a datum for dimensioning of component position.

7. A connector module for a lighting dimmer rack comprising:

a chassis having a front panel, a rear panel and first and second opposing side panels;

at least one load input connector mounted in said rear panel adjacent said first side panel;

at least one floating terminal connector mounted in said rear panel proximate said second side panel; and at least one standard lighting connector mounted in said front panel and electrically connected to said load input connector and to said floating terminal connector for neutral return.

8. A connector module as defined in claim 7 further comprising a side load spring mounted to said first side and urging said second side of the chassis against a bay wall in the dimmer rack, said bay wall constituting a datum for dimensioning of component position.

* * * * *